Figure 1:
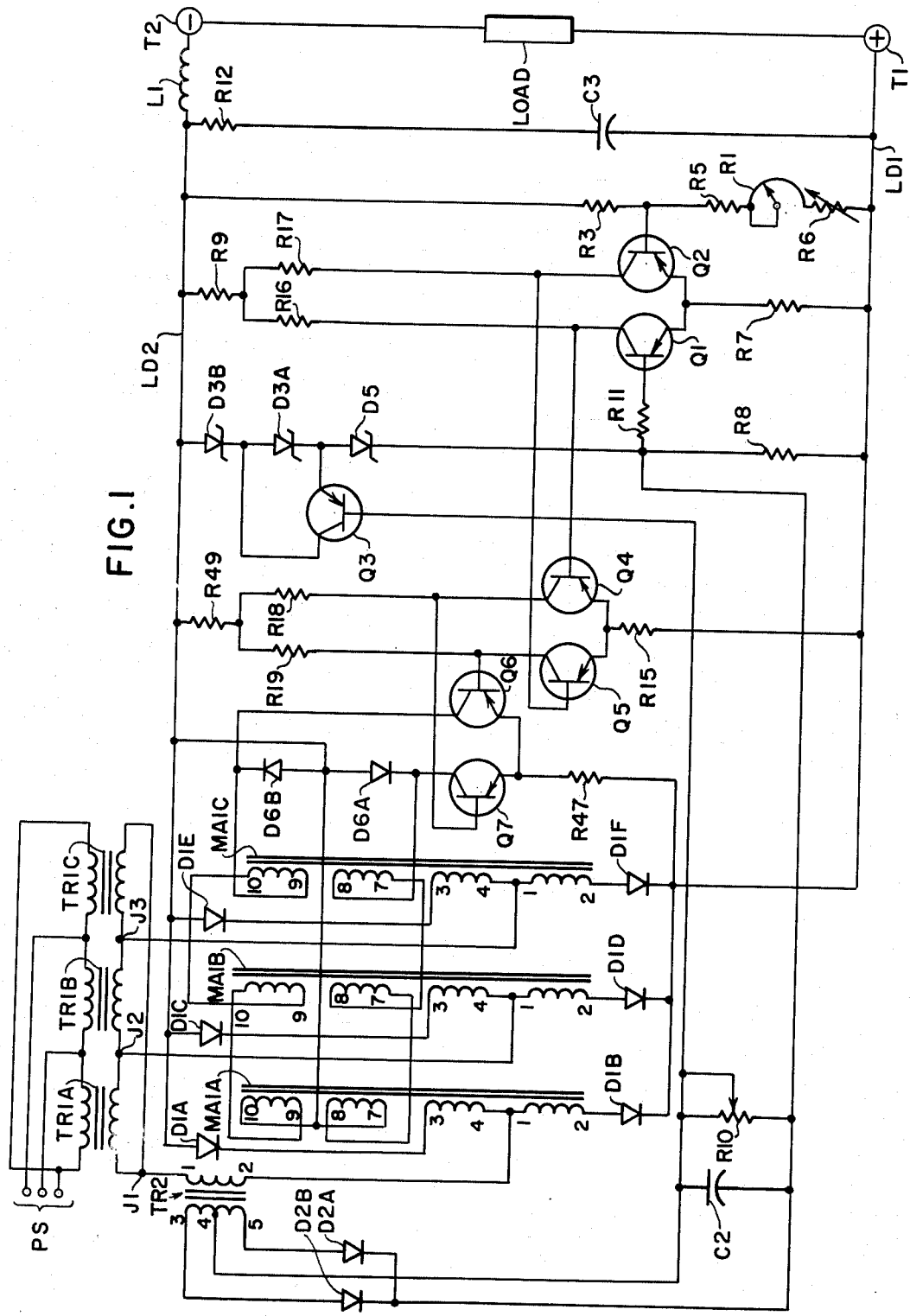

July 12, 1966  E. C. RHYNE, JR  3,260,918
REGULATED POWER SUPPLY
Filed Jan. 26, 1962
2 Sheets-Sheet 2 ced July 12, 1966

United States Patent Office 3,260,918
Patented July 12, 1966

3,260,918
REGULATED POWER SUPPLY
Earl C. Rhyne, Jr., Millis, Mass., assignor to The Warren Manufacturing Company, Inc., Littleton, Mass., a corporation of Massachusetts
Filed Jan. 26, 1962, Ser. No. 168,911
12 Claims. (Cl. 321—18)

My invention relates to regulators for power supplies, and particularly to regulators for filtered or unfiltered power supplies employed as battery chargers in central telephone exchanges or the like.

An object of my invention is to provide a power-source-energized regulated power supply which is unharmed by voltage surges from its power source and which maintains a constant output voltage over a suitable operating range of load currents.

Another object of my invention is to provide a regulated power supply wherein the power source voltage may exhibit a surge of two or three times the normal direct voltage without adversely affecting the components within the power supply.

It is still another object of my invention to provide an alternating-current-energized direct-voltage power supply which normally regulates over a significant range of load currents and which automatically lowers the output voltage when the load current increases beyond a predetermined value outside the significant load-current range.

Still another object of the invention is to provide a regulated direct voltage output from an alternating power source which exhibits a back-up current vs. voltage characteristic. By virtue of such a back-up characteristic, as the load current exceeds a predetermined value, the output voltage across the load decreases; however, this decrease in output voltage effects a decrease of the current through the load over a limited voltage range. Such a back-up characteristic is desirable in many applications.

These and many other objects and advantages of my invention will become obvious from the following detailed description of circuits which embody the features of the invention. The various features of novelty, however, are pointed out with particularity in the claims annexed hereto and forming a part of the specification. In the drawings:

FIG. 1 schematically illustrates a circuit producing a regulated output D.C. voltage from an alternating-current input voltage, and embodying features of this invention.

Figure 2:
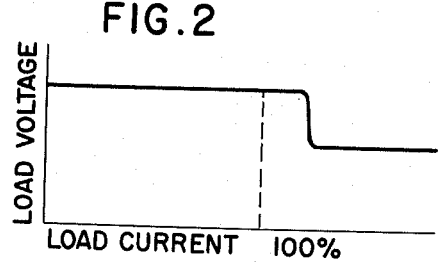

FIG. 2 graphically represents the current vs. voltage characteristics associated with the circuit in FIG. 1.

Figure 3:
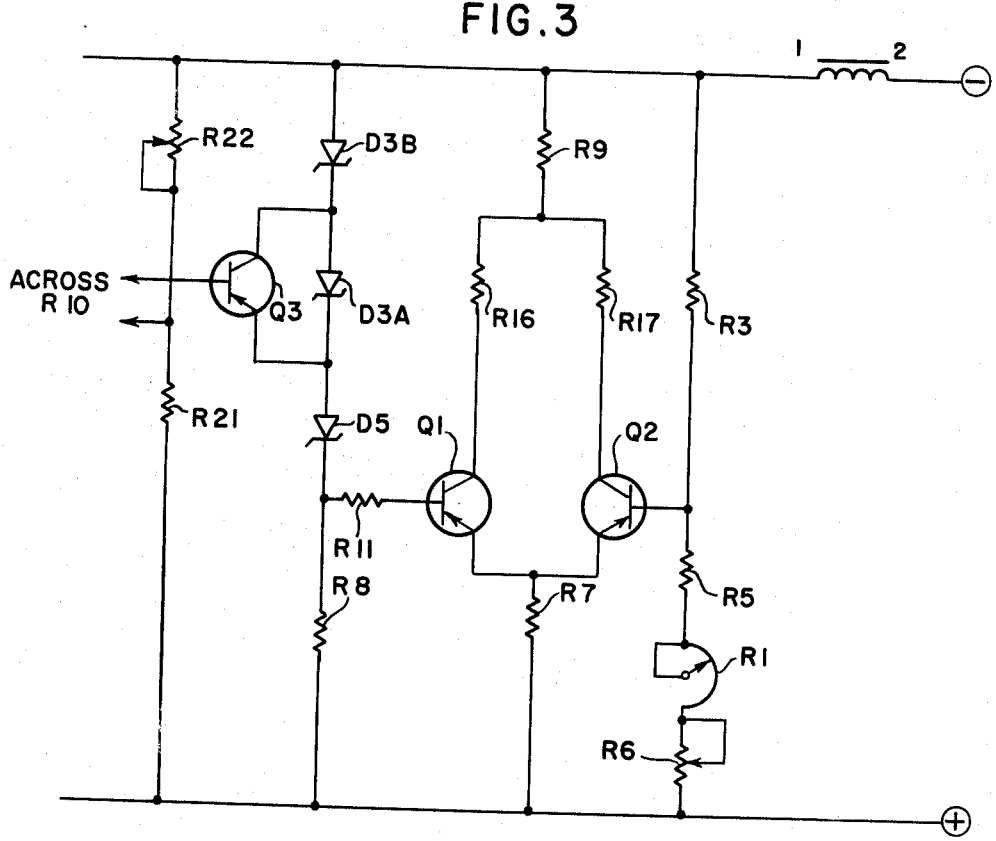

FIG. 3 shows, by way of a circuit diagram of a modified portion of FIG. 1, a modification of FIG. 1 which embodies features of the invention. This embodiment of the invention exhibits the above-mentioned back-up characteristic.

Figure 4:
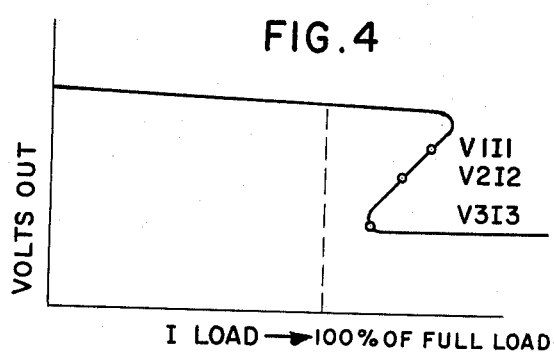

FIG. 4 graphically illustrates the back-up characteristic of the circuit in FIG. 1 modified as shown in FIG. 3.

The illustrated embodiments of my invention consistently employ P-N-P transistors although it will be understood that with suitable polarity modifications the invention contemplates using N-P-N transistors. Similarly, while Zener diodes are shown in connection with circuits for producing constant potentials, silicon diodes, oppositely poled to the Zener diodes, may be used in place thereof. The invention also contemplates employing any circuit part which operates as an isopotential member over a significant range of currents in place of the Zener diodes.

In FIG. 1 a three-phase 230 volt source PS supplies voltage for direct voltage output to a load L across plus terminal T1 and minus terminal T2. The intervening three-phase rectifying and control circuit embodies the invention. Three power transformers TR1A, TR1B and TR1C possess delta-connected primary windings inductively interlinked with delta-connected secondary windings and step down the voltage of the source PS to a predetermined level measured across the mutual junctions J1, J2 and J3 of the secondary windings. Three corresponding forward branches of a three-phase bridge rectifying network may be traced respectively from the junctions J1, J2, J3 through three separate variable-impedance windings 1, 2 of three magnetic amplifiers MA1A, MA1B, MA1C respectively, through three separate diodes D1B, D1D, D1F respectively, to the line LD1 and to a plus terminal T1 at a load L. The circuit from junction J1 to windings 1, 2 of magnetic amplifier MA1A also passes through the primary windings 1, 2 of an auxiliary current transformer TR2. A return branch of the three-phase bridge rectifying network may be traced from a minus terminal T2 at the load L through a line LD2. The return branch then splits into three branches and can be traced through three separate diodes D1A, D1C, D1E respectively, through three separate variable impedance windings 3, 4 of magnetic amplifiers MA1A, MA1B, MA1C respectively, and back to the respective junctions J1, J2, J3. In the succeeding discussion the designations TR1 and MA1 serve to respectively indicate the transformers TR1A, TR1B, TR1C collectively and magnetic amplifiers MA1A, MA1B and MA1C collectively. The magnetic amplifiers MA1 each possess a pair of control windings 7, 8 and 9, 10 which vary the flux in the saturable cores of the magnetic amplifiers.

Generally the currents from the respective junctions of the delta-connected secondaries of the transformer TR1 all pass through the impedance windings 1, 2 and 3, 4 in the respective magnetic amplifiers MA1. The impedance of the respective windings 1, 2 and 3, 4 in magnetic amplifiers MA1 can thus control the currents passing through the current rectifying diodes D1B, D1D and D1F where rectification occurs, to the terminal of the output. Return current from the negative terminal T2 of the output passes back to the three diodes D1A, D1C and D1E which are respectively connected to the windings 3, 4 of the magnetic amplifiers MA1A, MA1B and MA1C. At the start of each conducting half cycle in each of the three phases of current flow through the series-connected corresponding diodes D1A to D1F the magnetic amplifiers MA1 are unsaturated, and the impedance exhibited by the windings 1, 2 and 3, 4 is high. At this time almost all the voltage from the respective junctions J1 to J3 is impressed across the high impedance in windings 1, 2 and 3, 4 and only negligible voltage appears across the load L. Once during each conducting half cycle of each phase the currents through the windings 1, 2 and 3, 4 increase the flux in the core from its starting level until the core of the magnetic amplified abruptly saturates; it being of course understood that the cores of the magnetic amplifiers MA1 are readily saturable. The angle in each conducting half cycle of each of the three phases at which saturation occurs is designated the saturation angle. Saturation of the individual cores in magnetic amplifiers MA1 reduces the impedance of the corresponding windings 1, 2 and 3, 4 to a negligible value so as to impress most of the voltage from the transformers TR1 across the load L.

The angle, hence the time, over which the voltage is impressed across the load L during each half cycle in each of the three rectifying phases determines the average value of the voltage across the load. This average value of voltage can be controlled by varying the time within each half cycle in each rectifying phase during which the voltages are impressed across the load, hence by varying the time during which the magnetic amplifiers are saturated, and hence by controlling the saturation angle. An additional flux through the cores of the individual magnetic amplifiers MA1 will retard or accelerate the time of saturation within each conducting half cycle of each phase. Such a control flux is obtained by varying the currents through the windings 7, 8 and 9, 10 in the magnetic amplifiers MA1. The latter windings are arranged to have opposing effects in each magnetic amplifier. Thereby equal currents in the windings 7, 8 and 9, 10 produce zero control flux and a saturation angle of preferably 90°. Increasing the current in one winding relative to the other opposing winding reduces the saturation angle thereby increasing the time in each half cycle of each phase during which saturation occurs; thereby increasing the average voltage across the load. On the other hand, increasing the current in the other winding relative to the first increases the saturation angle and decreases the time during which saturation occurs in each half cycle of each phase; thereby decreasing the load voltage. Thus, depending upon the direction of current flow and the winding direction of the control windings 7, 8 and 9, 10 direct current through these control windings will increase and decrease the saturation angle of the core.

According to FIG. 1, an increase in current through windings 7, 8 and a decrease in current through windings 9, 10 tends to increase the saturation angle thereby decreasing the average voltage across the load L. The circuits controlling the currents through the last-mentioned sets of control findings essentially consist of an output-voltage sensing circuit or stage and a magnetic-amplifier driving circuit. The sensing stage comprises a pair of differential-amplifier-connected transistors Q1 and Q2 and the associated voltage supply circuits. A voltage dropping resistor R9 connects the negative lead LD2 of the power source to two resistors R16, R17 which energize the collectors of transistors Q1 and Q2 respectively. A common-emitter resistor R7 joins the emitters of the last-named transistors to the positive lead LD1 of the source. A temperature-compensating resistor R11 electrically joins the base of transistor Q1 to a constant-voltage-maintaining circuit essentially comprised of a current supply resistor R8 connected from the positive lead LD1 of the power circuit to the resistor R11, and three serially connected Zener diodes D5, D3A and D3B poled as shown and connected to the negative lead LD2. The diode D5 connects directly to the resistor R11 and exhibits a constant voltage drop of 5 volts over its significant range of operating currents, the current values being determined by the resistor R8. The diodes D3A and D3B, energized from the negative lead of the power source each exhibit a voltage drop of 10 volts over their significant range of currents. The resistance of the resistor R8 is such that it causes the last-mentioned diodes D5, D3A and D3B to operate within their significant current ranges. Therefore, the voltage drop from the negative lead of the power source to the resistor R11 remains substantially constant. The base of the transistor Q2 receives biasing current from an output-voltage-sensing voltage divider comprised of resistors R3, R5, R1 and R6 at the junction of resistors R3 and R5, the functions of the resistors R1 and R6 being explained below.

When the D.-C. output voltage rises, the voltage across the resistor R3 increases relative to the Zener voltage, effecting a more positive voltage at the base of transistor Q2. When the base of transistor Q2 becomes more positive relative to its emitter, the collector of transistor Q2 becomes more negative and the collector of transistor Q1 becomes more positive.

The collectors of transistors Q1 and Q2 connect respectively to the bases of differential-amplifier connected transistors Q4 and Q5 which constitute part of the magnetic-amplifier drive circuit. The signal of more negative potential on one base than the other will render the corresponding collector more positive and the companion collector more negative. A resistor R15 serves as a common emitter resistor for each of the transistors Q4 and Q5. A voltage-dropping resistor R49 joins the negative lead LD2 of the power circuit through a pair of collector resistors R18 and R19 which electrically connect the collectors of the respective transistors Q4 and Q5. Direct lines conductively join the collectors of transistors Q4 and Q5 to the base of transistors Q7 and Q6 respectively, the latter transistors again being connected in potential-difference configuration of Q4, Q5. A common emitter resistor R47 connects the respective emitters of transistors Q6 and Q7 to the positive lead LD1 while the collectors of the latter transistors receive current from the negative lead LD2 of the power source through windings 9, 10 and 7, 8 respectively of each of the magnetic amplifiers MA1. The windings 9, 10 are each connected in series with each other and affect the cores of amplifiers MA1 in a like sense. The windings 7, 8 are also connected in series with each other and, as stated, effect a flux in the respective cores of transformer MA1 in a sense opposite to that caused by windings 9, 10. The series-connected windings 7, 8 and 9, 10 connect the negative lead LD2 of the power source to the respective collectors of transistors Q6 and Q7. The currents in the windings 7, 8 and 9, 10, as stated, controls the saturation angle in windings 1, 2 and 3, 4.

In closed-loop operation a voltage differential at the bases of transistors Q1 and Q2, caused by the load-voltage-proportional potential across resistor R3 relative to the voltage across diodes D3A, D3B, D5, effects a voltage differential between the bases of transistors Q4, Q5 and Q6, Q7. The latter results in a current differential in windings 7, 8 and 9, 10 so as to set a particular saturation angle corresponding to the voltage differential at the bases of transistors Q1, Q2. Preferably for equal base voltages the saturation angle in magnetic amplifiers MA1 for the individual half cycles in each of the three phases remains at a present angle as required to obtain equilibrium voltage.

In a voltage regulating mode when the D.C. output voltage at terminals T1, T2 lowers from the predetermined steady state value as the result of an increased load for example, the voltage across resistors R3 becomes less, upsetting the previously existing equilibrium voltage differential at the bases of transistors Q1 and Q2. Under these conditions, the voltage at the base of transistor Q2 becomes more negative thereby rendering the voltage at the collector of transistor Q2 more positive. The more positive voltage on the collector of transistor Q2 makes the voltage at the base of transistor Q5 more positive and the voltage at the collector thereof more negative. This results in a more positive voltage at the collector of transistor Q6 and increased current through the emitter-collector circuit of transistor Q6. As the collector of transistor Q2 has become more positive, the collector of transistor Q5 more negative and the collector of transistor Q6 more positive, the collector of transistor Q1 has become more negative, the collector of transistor Q4 more positive and the collector of transistor Q7 more negative. Thus an increase in the current through windings 9, 10 of magnetic amplifiers MA1 and a decrease in windings 7, 8 obtains. This increase in current advances the saturation angle of the cores in magnetic amplifiers MA1 for each half cycle in each phase. This in turn increases the voltage across the load L sufficiently to restore the voltage at the base of transistor Q2 to the previously existing equilibrium differential.

If the output voltage departs from the predetermined value in an upward direction, the voltage across the resistor R3 increases and the voltage at the base of transistor Q2 becomes more positive relative to the voltage at the base of transistor Q1. The opposite collectors in the varying transistors are now rendered more positive and negative, as was the case for low output voltage. The current through the windings 7, 8 then increase as the current through the windings 9, 10 decrease thereby retarding the saturation angle within each half cycle of each phase in the rectifier. The voltage across resistor R3 is thereby lowered until an equilibrium condition prevails and the desired voltage across the load is obtained.

To adjust the level of the output voltage to a second predetermined value, the invention employs the resistor R1, which is an adjustable rheostat, and the resistor R6, which is an adjustable resistor. Raising the resistance of the resistor R1 decreases the current through the resistor R3 and makes the voltage at the base of transistor Q2 more negative or less positive. This causes the collector of transistor Q2 to become more positive and eventually advances the saturation angle to effect an increase in the output voltage. The latter increase results in an increase in the current through resistor R3 and the base of transistor Q2 is shifted to a new equilibrium voltage corresponding closely to the prior voltage differential. This increase in output voltage was accomplished without changing the voltage of the bases of transistors Q1 and Q2 relative to the negative lead LD2, by virtue of diodes D3A, D3B, D5. The emitters of the last-mentioned transistors would have become more positive relative to the bases if the current increase occasioned thereby through the transistors as well as the resistor R7 did not occur. This causes the emitter potentials to approach the voltage of the collector as determined by the Zener diodes D3A, D3B, D5 and increased current lowers i.e. makes more negative, the voltage of the emitters to a value commensurate with the respective base potentials. Thus a rise in load voltage due to a change in the value of R1, or to a voltage surge does not appreciably raise the collector-emitter or collector base voltage in transistors Q1, Q2 but harmlessly raises the voltage across resistor R7. This is an important advantage in the circuits embodying the present invention. If the voltage of the bases in transistors Q1 and Q2 were held at a constant potential relative to the positive leads of the present circuit, upward adjustment of the output voltage by changing of the resistor R1 or R6 would substantially increase the voltage across the collector-emitter circuits of the transistors. Thus all of the increase in the output voltage would then appear in the collectors of the regulating transistors. In such cases, the voltage applied to the collector of the transistors through the combination of surge or increase in the ouput voltage may become greater than the voltage that the transistor can tolerate and cause shorting of the transistor base-to-collector diode junction. However, in the circuit according to FIG. 1, the regulated direct-voltage output may be adjusted upward or downward without effecting the voltage between the base of the transistors and the negative lead LD2, or the collector of the transistors. The sum of the currents in the emitter resistor R7 serves to lower or raise the potential of the emitters to compensate for the rise or fall of the output voltage.

A circuit of the type described may safely handle an output voltage from approximately 130 volts to values upwards of 280 volts, an incremental voltage rise of 150 volts. Such a rise extends well beyond the capabilities of many power transistors and would normally impose upon them severe limitations which would not permit sustaining of additional surges. In circuits not employing the biasing described in FIG. 1, a change of 150 volts for a nominal 130 volt output, would impose severe heating upon the regulating transistors because the increase in voltage at the collector is accompanied by heating of the collector.

In the present invention, in addition to the voltage across resistor R7 increasing when the output voltage rises, the voltages across resistors R9, R16 and R17 increase in direct proportion to the increase in current through resistor R7. This effect limits the practical value to which the output voltage may be increased, because if the output voltage exceeded the practical maximum value, the transistors Q1 and Q2 would both saturate. Saturation of both of these transistors effectively eliminates the regulating action of the circuit in FIG. 1 but results in no damage to the transistors and represents a safe self-limiting feature. For example, where the input voltage exhibits a surge two or three times the normal D.-C. voltage, the voltage across resistor R3 increases as previously described causing transistor Q2 to decrease conduction and Q1 to increase conduction. The off transistor Q2 then sustains a voltage from base to collector that can be less, even with the surge, than the combined Zener voltage. The voltage across the emitter-collector circuit of the off transistor Q2 substantially equals the current that is sustained in the surge through resistor R7 multiplied by the value of resistor R16.

For all practical purposes this safely allows the circuit to sustain over-voltages from the source of up to several hundred volts without damage, for example three or four hundred volts for a nominal 130 volt supply. The collector voltages of transistors Q1 and Q2 operate in a range of values limited by the combined Zener voltages even under surge conditions thereby permitting operation of low-voltage transistors and high-voltage D.-C. circuits. Essentially the voltage surges are converted into current which the transistors can sustain providing they are completely turned on during these surges. For example, a typical transistor operating at a 1 ampere steady-state value can withstand 12 to 20 amperes for surge conditions if it is fully turned on. However, such a transistor partly turned off, or in its active power-amplifying state could not withstand this type of current surge.

Thus far the description of FIG. 1 has limited itself to the voltage-resgulating aspects of the present invention while ignoring certain parts of the circuit. The circuit of FIG. 1 accomplishes current limiting by connecting the collector-emitter circuit of a transistor Q3 across the ten volt Zener diode D3A, the emitter thereof connecting to the positive end of the Zener diode. The base of transistor Q3 receives biasing current from the negative terminal of an auxiliary full-wave rectified power supply which receives alternating current from the secondary windings 3, 4, 5 of the transformer TR2.

This conventional rectifying circuit comprises rectifying diodes D2A and D2B connected for full-wave rectification to the extreme terminals 3 and 5 of the secondary winding of transformer TR2 and to each other to form a positive lead, a negative lead wire connected to the center tap 4 of the last-named winding, and a filter capacitor C2. A variable resistor R10 connected across the capacitor C2, possesses a negative wiper or armature end electrically joined to the base of transistor Q3, and a positive stator end joined to the positive side of the diode D5.

This portion of the circuit operates as follows. The resistor R10 maintains an adjustment to bias the base of transistor Q3 to a cut-off condition whereby the transistor Q3 has no influence on the circuit of FIG. 1 in the voltage-regulating mode. The current transformer TR2 supplies a current-proportional signal to rectifiers D2A and D2B, which rectifiers then produce a D.-C. signal across resistor R10. Because the positive stator end of the resistor R10 connects to a point which is 5 volts more positive than the emitter potential of transistor Q3, no current flows through resistor R10 when no load current flows. Thus the base of transistor Q3 dwells at a potential 5 volts more positive than the emitter of P-N-P transistor Q3, as determined by the Zener voltage of the diode D5. In this condition transistor Q3 is completely cut off and does not influence Zener diode D3A. When the resistance of the load is finite and begins to draw current, the D.-C. voltage across resistor R10 increases, and the base of transistor Q3 becomes more negative. When the load resistance is low enough and the voltage across resistor R10 equals the voltage across the Zener diode voltage D5, the emitter-collector circuit of transistor Q3 conducts and diverts current from Zener diode D3A. When enough current is diverted from the latter diode, the diode voltage across the Zener diode D5 decreases and results in a smaller Zener reference diode voltage. Thereby the Zener-dependent voltage regulating system operates to maintain a lower output voltage, reducing slightly the line current or load current at a predetermined current value by increasing the magnetic amplifier impedance. In FIG. 1 the current begins to limit at 125% of the full-load current.

At each incremental reduction in the load impedance tending to increase the load current, the transistor Q3 increases the saturation angle in magnetic amplifier MA1, lowers the output voltage to prevent the attempted increase in load current until transistor Q3 saturates and the Zener diode D3A is completely shorted. The system then continues to regulate at a voltage determined by Zener diodes D3B and D5 only. The increase in current therefore effectively shorts out the Zener diode D3A and lowers the reference voltage of the system causing the output voltage to lower.

FIG. 2 illustrates the voltage output characteristics with respect to load current for the circuit of FIG. 1. As load current increases from zero to 125% of full-load, the output or load voltage remains substantially constant. At 125% of full load current the load voltage drops abruptly to another constant value. However, it is sometimes valuable to obtain the current-voltage characteristic shown in FIG. 4, where as the current exceeds a predetermined value the load voltage will decrease until a lower constant voltage level is attained. This is called a back-up characteristic, and in the back-up range the regulator circuit essentially exhibits a negative impedance between the source voltage and the load.

FIG. 3 illustrates the modification of the circuit of FIG. 1 necessary to produce the characteristic shown in FIG. 4. FIG. 3 represents only the portion of the circuit of FIG. 1 which includes the transistors Q1, Q2 and Q3. All elements are the same as those shown in FIG. 1 with the exception of the additional resistors R21 and R22 which form a voltage divider across the load. The positive lead from the auxiliary power supply D2A, D2B, R10, etc., connects to the mid-potential of the divider. As can be seen and has been stated, the only difference between this circuit and the circuit of FIG. 1 is the connection of this positive lead, coming from resistor R10, and capacitor C2, to the voltage divider instead of to the resistor R8. In FIG. 3 the reference potential of the base of transistor Q3 is determined by the voltage divider rather than the resistor R8. Since the voltage divider is connected across the leads of the output voltage the reference potential of the base of transistor Q3 varies as the output voltage varies. Accordingly the current limit value of the circuit varies and the voltage output exhibits the characteristic shown in FIG. 4.

The circuit of FIG. 3 operates as follows. When the load exhibits infinite impedance and no current flows in the load circuit, the voltage of the base of transistor Q3 equals that of the voltage divider R21 and R22. Under this condition the voltage divider is selectively set to cut off the transistor Q3 by making the transistor Q3 base approximately 5 volts positive with respect to the emitter. Thus the transistor Q3 is held off hard and causes very little current to flow through the collector of transistor Q3, so as to have little, if any, influence upon the operation of the Zener diode D3A. When the load impedance lowers to a finite value and load current flows, a current-corresponding voltage develops across the resistor R10 such that the voltage at the base of transistor Q3 approaches the emitter voltage. For lower load impedances and load currents slightly larger than this value, transistor Q3 begins to turn on and divert through its collector-emitter circuit part of the current which normally would flow through the Zener diode D3A.

When the load impedance drops below a predetermined value and attempts to draw current greater than a predetermined value transistor Q3 diverts most of the current through Zener diode D3A, as a result of Q3 being turned on by the load current. The voltage across the Zener diode then begins to drop. As this voltage drops, the output voltage also decreases as a result of an increasing saturation angle in magnetic amplifiers MA1. Deceased output voltage prevents the attempted increase in load current. However, the circuit not only prevents the attempted increase in load current but actually decreases the current. This occurs because as the output voltage decreases the base voltage at transistor Q3 becomes more negative relative to the emitter voltage, which remains constant relative to the negative lead of the power source, and further increases conduction in transistor Q3. This and further increased conduction results in further decrease of the voltage across the diode D3A and increasing of the magnetic amplifier saturation angle accompanied by lowering of the load voltage, until the load current, and hence the R10 voltage, is small enough to prevent still further increased conduction in transistor Q3. Equilibrium results. Point V1, I1 in FIG. 4 represents such a condition. When the load impedance drops still further the load voltage and current drop to another equilibrium point such as V2, I2 in FIG. 4. This decrease in load impedance may continue until transistor Q3 saturates at point V3, I3. The voltage then levels off as determined by diodes D3B, D5.

It should be pointed out that the reference voltage used for establishing the current limit point comes from a voltage-dividing pair of resistors across the load. The fact that this reference voltage is directly proportional to the regulated output voltage results in what I call the back-up characteristic. The back-up characteristic occurs because when the current limit point is reached a lowering in the output voltage results. However, when the output voltage lowers so does the reference voltage since it is proportional to the output voltage. This establishes a new and lower current limit value because the respective reference is lowered. This chain reaction occurs until the current is low enough to prevent further lowering of the output voltage.

The back-up characteristic is desirable in many applications, for instance in a controlled rectifier application.

While several embodiments of the invention have been described herein, it will be understood that the invention may be otherwise embodied and that the invention is not limited thereto.

I claim:

1. A regulated rectifier power supply circuit for energizing a load having two terminals, comprising alternating-current power input means connected across the load, diode rectifying means connected between said input means and the load, load-voltage responsive control means connected to said rectifying means for varying the impedance of said rectifying means whereby the load voltage is regulated, said control means including constant potential means for establishing a constant load voltage and having a member exhibiting a constant voltage over a range of currents therethrough, circuit means in said control of currents therethrough, circuit means in said control means for establishing a current through said member, and load current responsive means connected across said constant potential means for drawing off current therefrom so as to vary its potential when the load current exceeds a predetermined value.

2. A regulated rectifier circuit for energizing a load comprising voltage means for impressing a voltage across the load, rectifier means interposed between the load and said voltage means, control means for regulating the load voltage in response to variation of the load voltage from a predetermined potential, constant potential means for establishing said predetermined potential and including a semiconductor member connected to draw current and exhibiting a constant voltage thereacross over a limited range of currents therethrough, and load-current responsive means for varying the voltage across said constant potential means including a transistor having a collector-emitter circuit connected for drawing off current from said semiconductor member and having an emitter base circuit responsive to the load current for varying the conductivity of said emitter-collector circuit.

3. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means in response to the load voltage whereby the load voltage is regulated, said control means including a differential amplifier having two inputs and an output, constant potential means having a member exhibiting a constant potential over a range of currents therethrough and connected to one of said amplifier inputs for establishing a constant voltage relative to a terminal of said load, voltage divider means connected across the load for establishing at the other amplifier input a potential proportional to the voltage across said load, whereby when the voltage across said load exceeds a predetermined value the output varies abruptly, a driving circuit having an input connected to the output of said transistors and an output connected to said magnetic amplifier means for varying the impedance of said magnetic amplifier means in response to the conduction of said transistors and load current responsive means connected across said constant potential means for drawing off current from said constant potential means so as to vary its potential when the load current exceeds a predetermined value.

4. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means in response to the load voltage whereby the load voltage is regulated, said control means including a pair of differential-amplifier-connected transistors each having an emitter-collector circuit and a base, constant potential means having a member exhibiting a constant potential over a range of currents therethrough and connected to one base of said transistors for establishing a constant voltage at the last-mentioned base relative to a terminal of said load, voltage divider means connected across the load and to the other base for establishing at the other base a potential proportional to the voltage across said load, whereby when the voltage at the bases vary the conduction in one of said transistors increases the conduction in the other of said transistors decreases, a driving circuit having an input connected to the collectors of said transistors and an output connected to said magnetic amplifier means for varying the impedance of said magnetic amplifier means in response to the conduction of said transistors, said driving circuit including differential amplifier, and load current responsive means connected across said constant potential means for drawing off current from said constant potential means so as to vary its potential when the load current exceeds a predetermined value.

5. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means in response to the load voltage whereby the load voltage is regulated, said control means including a pair of differential-amplifier-connected transistors each having emitter and a collector forming an emitter-collector circuit and a base, said collectors being connected to one of the terminals, constant potential means connected to the base of one of said transistors for establishing a constant voltage at the last-mentioned base relative to the terminal connected to said collectors, voltage divider means connected across the load for establishing at the other base a potential proportional to the voltage across said load, whereby when the voltage at the other base departs from the constant voltage the conduction in one of said transistors decreases, a driving circuit having an input connected to the collectors of said transistors and an output connected to said magnetic amplifier means for varying the impedance of said magnetic amplifier means in response to the conduction of said transistors, said driving circuit including a differential amplifier, said magnetic amplifier means including an active winding connected in series with said source, a control winding connected to said driving means and a saturable core whereby upon variation of current through said control winding the impedance of said active winding is varied.

6. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means whereby the load voltage is regulated, said control means including a pair of differential-amplifier-connected transistors each having an emitter-collector circuit and a base, constant potential means connected to the base of a first of said transistors for establishing a constant voltage at the last-mentioned base relative to a terminal of said load, voltage divider means connected across the load for establishing at the base of the second of said transistors a potential proportional to the voltage across said load whereby when the voltage across said load exceeds a predetermined value the conduction in one of said transistors increases and the conduction in the other of said transistors decreases, a driving circuit having an input connected to the collectors of said transistors and an output connected to said magnetic amplifier means for varying the impedance of said magnetic amplifier means in response to the conduction of said transistors, said constant potential means being connected to draw current and being effective to establish constant potential over a limited range of current values passing therethrough, said control means including a bypass transistor having an emitter-collector circuit connected to said constant potential means for drawing off a portion of the current passing through said constant potential means and an emitter-base circuit connected to respond to the load current so as to vary the conduction of the emitter-collector circuit of said bypass transistor and thereby vary over a wide range the current drawn off from said constant potential means whereby the base potential of the first of said differential-amplifier transistors is substantially varied in response to the load current and whereby a predetermined variation in load voltage results in response to variation of load current.

7. A regulated rectifier circuit for energizing a load having two terminals, comprising alternating-current power input means connected across the load, diode rectifying means connected between said input means and the load, magnetic amplifier means serially connected between said input means and the load, load-voltage responsive control means connected to said magnetic amplifier means for varying the impedance of said magnetic amplifier means whereby the load voltage is regulated, said control means including a pair of differential-amplifier-connected transistors each having an emitter and a collector and a base, an emitter biasing resistor connected to a first terminal of said load and to both of said emitters, collector resistance means for separately biasing each of said collectors, constant potential means connected to the base of one of said transistors for establishing a constant voltage at the last-mentioned base relative to the second terminal of said load, voltage divider means connected across the load for establishing at the other base a potential proportional to the voltage across said load whereby when the voltage at the other base departs from the constant voltage the conduction in one of said transistors increases and the conduction in the other of said transistors decreases, a driving circuit having an input connected to the collectors of said transistors and an output connected to said magnetic amplifier means for varying the impedance of said magnetic amplifier means in response to the conduction of said transistors, said driving circuit including a differential amplifier, said magnetic amplifier means including an active winding connected in series with said source, a control winding connected to said driving means and a saturable core whereby upon variation of current through said control winding the impedance of said active winding is varied, said constant potential means being connected to draw current and being effective to establish constant potential over a limited range of current values passing therethrough, said control means including a bypass transistor having an emitter-collector circuit connected to said constant potential means for drawing off a portion of the current passing through said constant potential means and an emitter-base circuit connected to respond to the load current so as to vary the conduction of the emitter-collector circuit of said bypass transistor whereby the base reference amplifier transistor is substantially varied and whereby a predetermined variation in load voltage results in response to variation of load current.

8. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means whereby the load voltage is regulated, said control means including a pair of differential-amplifier-connected transistors each having an emitter and a collector and a base, an emitter biasing resistor connected to a first terminal of said load and to both of said emitters, collector resistance means for separately biasing each of said collectors, constant potential means connected to the base of one of said transistors for establishing a constant voltage at the last-mentioned base relative to the second terminal of said load, voltage divider means connected across the load for establishing at the other base a potential proportional to the voltage across said load whereby when the voltage across said load exceeds a predetermined value the conduction in one of said transistors increases and the conduction in the other of said transistors decreases, a driving circuit having an input connected to the collectors of said transistors and an output connected to said magnetic amplifier means for varying the impedance of said magnetic amplifier means in response to the conduction of said transistors, said constant potential means including a plurality of series connected current-sensitive constant potential members energized by said load voltage and operable in constant potential condition over a limited range of current values, a bypass transistor in said control means having an emitter-collector circuit connected across one of said constant potential members to draw off a portion of the current from the one of said constant potential members, and an emitter-base circuit in said bypass transistor connected to respond to the load current so as to vary the conduction of the emitter-collector circuit of said bypass transistor thereby drawing off sufficient current from said constant potential means to vary the base reference potential of the first one of said pair of differential-amplifier transistors, and whereby a predetermined variation in load voltage results in response to variation of load current.

9. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means to thereby regulate the load voltage said amplifier means to thereby regulate the load voltage said control means including a pair of differential-amplifier-connected transistors each having an emitter and a collector and a base, an emitter biasing resistor connected to a first terminal of said load and to both of said emitters, collector resistance means for separately biasing each of said collectors, constant potential means connected to the base of one of said transistors for establishing a constant voltage at the last-mentioned base relative to the second terminal of said load, voltage divider means connected across the load for establishing at the other base a potential proportional to the voltage across said load whereby when the voltage across the load exceeds a predetermined value the conduction in one of said transistors increases and the conduction in the other of said transistors decreases, a driving circuit having an input connected to the collectors of said transistors and an output connected to said magnetic amplifier means for varying the impedance of said magnetic amplifier means in response to the conduction of said transistors, said driving circuit including a differential power amplifier, said magnetic amplifier means including an active winding connected in series with said source, a control winding connected to said driving means and a saturable core, whereby variation of current through said control winding varies the impedance of said active winding, said constant potential means including a plurality of series connected current-sensitive constant potential members energized by said load voltage and operable in constant potential condition over a limited range of current values, a bypass transistor in said control means having an emitter-collector circuit connected across one of said constant potential members to draw off current from the one of said constant potential members sufficient to cause operation thereof outside the limited range of current values, an emitter-base circuit in said bypass transistor, load current responsive means connected to said base emitter circuit and to another of said constant potential members for varying the conduction of the emitter-collector circuit of said bypass transistor whereby the base reference potential of one of said pair of differential-amplifier transistors is substantially decreased and whereby a predetermined variation in load voltage results in response to variation of load current.

10. A regulated rectifier circuit for energizing a load having two terminals, comprising alternating-current power input means connected across the load, diode rectifying means connected between said input means and the load, magnetic amplifier means serially connected between said input means and said load, load-voltage responsive control means connected to said magnetic amplifier means for varying the impedance of said magnetic amplifier means in proportion to the load voltage whereby the load voltage is regulated, said control means including a pair of differential-amplifier-connected transistors each having an emitter and a collector and a base, an emitter biasing resistor connected to a first terminal of said load and to both of said emitters, collector resistance means for separately biasing each of said collectors, constant potential means connected to the base of one of said transistors for establishing a constant voltage at the last-mentioned base relative to the second terminal of said load, voltage divider means connected across the load for establishing at the other base a potential proportional to the voltage across said load whereby when the voltage across said load varies from a predetermined value the conduction in one of said transistors increases and the conduction in the other of said transistors decreases, a driving circuit having an input connected to the collectors of said transistors and an output connected to said magnetic amplifier means for varying the impedance of said magnetic amplifier means in response to the conduction of said transistors, said constant potential means including a plurality of series connected current-sensitive constant potential members energized by said load voltage and operable in constant potential condition over a limited range of current values, mid-potential producing means in said control means responsive to said load voltage for producing a potential point intermediate the terminal potential of said load, a bypass transistor in said control means having an emitter-collector circuit connected across one of said constant potential members, load-current responsive means connected to an intermediate potential point of said mid-potential producing means, and an emitter-base circuit in said bypass transistor connected to the load-current responsive means so as to vary the conduction of the emitter-collector circuit of said bypass transistor and of said constant potential members whereby the base reference potential of one of said pair of differential-amplifier transistors is substantially varied and whereby a predetermined variation in load voltage results in response to variation of load current.

11. A regulated rectifier circuit for energizing a load having two terminals, comprising alternating-current power input means connected across the load, diode rectifying means connected between said input means and the load, magnetic amplifier means serially connected between said input means and the load and in series with said rectifying means, load-voltage responsive control means connected to said magnetic amplifier means for varying the impedance of said magnetic amplifier means whereby the load voltage is regulated, said control means including a pair of differential-amplifier-connected transistors each having an emitter and a collector and a base, an emitter biasing resistor connected to a first terminal of said load and to both of said emitters, collector resistance means for separately biasing each of said collectors, constant potential means connected to one of the bases for establishing a constant voltage at the last-mentioned base relative to the second terminal of the load, voltage divider means connected across the load for establishing at the other base a potential proportional to the voltage across said load whereby when the load voltage departs from a predetermined value conduction in one of said transistors increases and the conduction in the other of said transistors decreases, a driving circuit having an input connected to the collectors of said transistors and an output connected to said magnetic amplifier means for varying the impedance of said magnetic amplifier means, said driving circuit including a differential power amplifier, said magnetic amplifier means including an active winding connected in series with said source, a control winding connected to said driving means and a saturable core whereby variation of current through said control winding varies the impedance of said active winding, said constant potential means including a plurality of series connected current-sensitive constant potential members energized by said load voltage and operable in constant potential condition over a limited range of current values, mid-potential producing means in said control means responsive to said load voltage for producing a potential point intermediate the terminal potential of said load, a bypass transistor in said control means having an emitter-collector circuit connected across one of said constant potential members, load-current responsive means connected to an intermediate potential point of said mid-potential producing means, and an emitter-base circuit in said control means connected to said load-current responsive means to respond to the load current so as to vary the conduction of the emitter-collector circuit of said bypass transistor thereby varying over a wide range the current passing through said constant-potential members whereby the base reference potential of the first one of said pair of differential-amplifier transistors decreases substantially and whereby a predetermined variation in load voltage results in response to variation of load current.

12. A circuit as claimed in claim 11, wherein said constant potential members are semiconductor diodes.

References Cited by the Examiner

UNITED STATES PATENTS

| 2,790,127 | 4/1957 | Hamilton | 321—25 X |
| 2,914,720 | 11/1959 | Merkle | 321—25 X |
| 2,986,690 | 5/1961 | Rhyne | 321—24 X |
| 3,084,322 | 4/1963 | Rhyne | 321—25 X |
| 3,087,107 | 4/1963 | Hunter et al. | 321—25 X |

FOREIGN PATENTS 1,211,651 10/1959 France.

LLOYD McCOLLUM, *Primary Examiner.*

ROBERT C. SIMS, *Examiner.*

A. J. GAZARSA, M. WACHTELL, *Assistant Examiners.*